United States Patent
Goyal et al.

(10) Patent No.: US 9,727,657 B2
(45) Date of Patent: Aug. 8, 2017

(54) MULTI-MODE BARCODE RESOLUTION SYSTEM

(71) Applicant: Verisign, Inc., Reston, VA (US)

(72) Inventors: Neel Goyal, Rockville, MD (US);
Patricia Kelly, Herndon, VA (US);
Pranab Kumar Dash, Bangalore (IN);
Daniel Schonfeld, Reston, VA (US)

(73) Assignee: VeriSign, Inc., Reston, VA (US)

( * ) Notice: Subject to any disclaimer, the term of this patent is extended or adjusted under 35 U.S.C. 154(b) by 53 days.

(21) Appl. No.: 14/703,292

(22) Filed: May 4, 2015

(65) Prior Publication Data

US 2015/0234929 A1    Aug. 20, 2015

Related U.S. Application Data

(63) Continuation of application No. 13/213,581, filed on Aug. 19, 2011, now Pat. No. 9,022,280.

(30) Foreign Application Priority Data

Jun. 24, 2011   (IN) .......................... 1806/DEL/2011

(51) Int. Cl.
*G06F 17/30* (2006.01)
*G06K 7/14* (2006.01)
(Continued)

(52) U.S. Cl.
CPC ........ *G06F 17/30879* (2013.01); *G06F 17/00* (2013.01); *G06F 17/30* (2013.01);
(Continued)

(58) Field of Classification Search
CPC .... G06F 17/30879; G06F 17/00; G06F 17/30; G06K 7/00; G06K 7/1404
See application file for complete search history.

(56) References Cited

U.S. PATENT DOCUMENTS 5,293,033 A * 3/1994 Yamashita ............... 235/462.14
5,324,922 A   6/1994 Roberts
(Continued)

FOREIGN PATENT DOCUMENTS

DE   102005001723 A1   7/2006
WO   2007025518 A1    3/2007
WO   2007113610 A1   10/2007

OTHER PUBLICATIONS

Non-Final Office Action dated Aug. 14, 2012, U.S. Appl. No. 13/213,581, filed Aug. 19, 2011, pp. 1-11.
(Continued)

*Primary Examiner* — Daniel Walsh
(74) *Attorney, Agent, or Firm* — Artegis Law Group, LLP

(57) ABSTRACT

Methods and systems for generating and resolving multi-mode barcodes include a device scanning and translating graphical data representing a barcode pattern into barcode information. The device detects distinct data items in the barcode information that each specifies an action to be taken by the device, and then transmits a request for a preference order to a remote server. Next, the device receives the preference order indicating a ranking of the distinct data items and determines, based on the ranking, an order in which actions specified by the data items are to be taken by the device. The device identifies a data item that the device is capable of taking the action specified by the data item and has a higher ranking in the preference order than the actions specified by all other data items that the device is capable of taking, and performs the action specified by the data item.

20 Claims, 7 Drawing Sheets

(51) Int. Cl.
*G06F 7/00* (2006.01)
*G06F 19/00* (2011.01)
*G06K 7/00* (2006.01)
*G06F 17/00* (2006.01)

(52) U.S. Cl.
CPC ............... *G06F 19/00* (2013.01); *G06K 7/00* (2013.01); *G06K 7/1404* (2013.01)

(56) References Cited

U.S. PATENT DOCUMENTS

| | | | |
|---|---|---|---|
| 5,479,515 A * | 12/1995 | Longacre, Jr. | G06K 19/06075 235/462.16 |
| 5,682,030 A * | 10/1997 | Kubon | G06K 7/10881 235/462.25 |
| 6,148,331 A | 11/2000 | Parry | |
| 6,192,945 B1 * | 2/2001 | Ford | G01N 1/312 141/2 |
| 6,282,183 B1 * | 8/2001 | Harris | G06Q 10/109 370/230 |
| 6,512,919 B2 * | 1/2003 | Ogasawara | 455/422.1 |
| 6,561,428 B2 | 5/2003 | Meier et al. | |
| 6,701,369 B1 | 3/2004 | Philyaw | |
| 7,430,588 B2 | 9/2008 | Hunter | |
| 7,770,797 B2 | 8/2010 | Weiner et al. | |
| 7,823,784 B2 | 11/2010 | Matsumoto | |
| 7,840,571 B2 | 11/2010 | Forman et al. | |
| 8,180,037 B1 | 5/2012 | Delker et al. | |
| 8,189,466 B2 | 5/2012 | Mueller et al. | |
| 8,526,922 B1 | 9/2013 | Koster | |
| 9,022,280 B2 * | 5/2015 | Goyal | G06F 17/30879 235/375 |
| 2001/0033682 A1 * | 10/2001 | Robar | A61N 5/1048 382/132 |
| 2001/0045461 A1 * | 11/2001 | Schuessler | 235/462.07 |
| 2002/0066022 A1 * | 5/2002 | Calder | G06F 21/121 726/26 |
| 2002/0185537 A1 * | 12/2002 | Konda | 235/462.01 |
| 2003/0042312 A1 | 3/2003 | Cato | |
| 2003/0173405 A1 * | 9/2003 | Wilz, Sr. | G06F 17/30879 235/462.01 |
| 2003/0192042 A1 * | 10/2003 | Takemoto | G06F 9/4415 717/177 |
| 2004/0205626 A1 | 10/2004 | Klotz et al. | |
| 2005/0008261 A1 | 1/2005 | Wolff et al. | |
| 2005/0011958 A1 | 1/2005 | Fukasawa et al. | |
| 2005/0044179 A1 | 2/2005 | Hunter | |
| 2005/0049890 A1 * | 3/2005 | Kan | G06Q 10/0837 705/408 |
| 2005/0061878 A1 | 3/2005 | Barenburg et al. | |
| 2005/0092833 A1 | 5/2005 | Glynn | |
| 2005/0171868 A1 * | 8/2005 | Healy | G06Q 20/12 705/26.8 |
| 2005/0178832 A1 | 8/2005 | Higuchi | |
| 2005/0189420 A1 | 9/2005 | Chen et al. | |
| 2005/0230470 A1 | 10/2005 | Hoshino | |
| 2005/0246337 A1 | 11/2005 | Forman et al. | |
| 2005/0274804 A1 | 12/2005 | Matsumoto | |
| 2006/0157574 A1 | 7/2006 | Farrar et al. | |
| 2006/0243807 A1 * | 11/2006 | Tien | 235/462.15 |
| 2008/0048044 A1 | 2/2008 | Zhao et al. | |
| 2008/0116278 A1 | 5/2008 | Epshteyn | |
| 2008/0217391 A1 | 9/2008 | Roof et al. | |
| 2008/0217392 A1 | 9/2008 | Weiner et al. | |
| 2008/0237331 A1 | 10/2008 | Hammer | |
| 2008/0254827 A1 | 10/2008 | Hunter | |
| 2009/0140035 A1 | 6/2009 | Miller | |
| 2009/0202058 A1 | 8/2009 | Khan | |
| 2009/0272810 A1 | 11/2009 | Barkan | |
| 2009/0305675 A1 | 12/2009 | Mueller et al. | |
| 2010/0261502 A1 | 10/2010 | Martin-Cocher et al. | |
| 2010/0269090 A1 | 10/2010 | Le Merrer | |
| 2011/0011926 A1 | 1/2011 | Matsumoto | |
| 2011/0087810 A1 * | 4/2011 | Barten | 710/62 |
| 2011/0117940 A1 * | 5/2011 | Pfaender et al. | 455/466 |
| 2011/0130129 A1 | 6/2011 | Snyder et al. | |
| 2011/0131235 A1 | 6/2011 | Petrou et al. | |
| 2011/0233280 A1 | 9/2011 | Bianconi et al. | |
| 2011/0270751 A1 | 11/2011 | Csinger et al. | |
| 2011/0295502 A1 | 12/2011 | Faenger | |
| 2012/0036225 A1 | 2/2012 | Chor | |
| 2012/0036226 A1 | 2/2012 | Chor | |
| 2012/0073241 A1 * | 3/2012 | Mahar | G01G 19/4148 53/55 |
| 2012/0102558 A1 | 4/2012 | Muraki | |
| 2012/0160911 A1 | 6/2012 | Smith et al. | |
| 2012/0166298 A1 | 6/2012 | Smith et al. | |
| 2012/0199643 A1 * | 8/2012 | Minnick | G06F 17/30879 235/375 |
| 2012/0223132 A1 | 9/2012 | Lim | |
| 2012/0314954 A1 | 12/2012 | Moore et al. | |
| 2012/0325902 A1 * | 12/2012 | Goyal | G06F 17/30879 235/375 |
| 2012/0330845 A1 | 12/2012 | Kang | |
| 2013/0041882 A1 * | 2/2013 | Brodsky | G06F 17/30902 707/709 |
| 2013/0112750 A1 * | 5/2013 | Negro et al. | 235/454 |
| 2013/0181043 A1 * | 7/2013 | Cok | G06K 19/06037 235/375 |
| 2013/0233916 A1 * | 9/2013 | Tran | 235/375 |
| 2013/0270336 A1 * | 10/2013 | Bonomo | G06Q 10/087 235/375 |
| 2014/0224879 A1 * | 8/2014 | Guigan | G07D 7/0006 235/462.06 |
| 2014/0263667 A1 | 9/2014 | Mege | |
| 2015/0234929 A1 * | 8/2015 | Goyal | G06K 7/1404 235/375 |
| 2015/0287070 A1 * | 10/2015 | Steidle | G06Q 30/0231 705/14.31 |

OTHER PUBLICATIONS

Notice of Allowance dated Jan. 8, 2013, U.S. Appl. No. 13/213,581, filed Aug. 19, 2011, pp. 1-10.
Extended European Search Report dated Feb. 14, 2013, published by the European Patent Office, European Application No. 12173493.3, filed Jun. 25, 2012, pp. 1-7.
Author Unknown, European Office Action dated Jun. 27, 2014, European Application No. 12173493.3, filed Jun. 25, 2012, pp. 1-7.
Notice of Allowance dated Jan. 5, 2015, U.S. Appl. No. 13/213,581, filed Aug. 19, 2011, pp. 1-9.

* cited by examiner

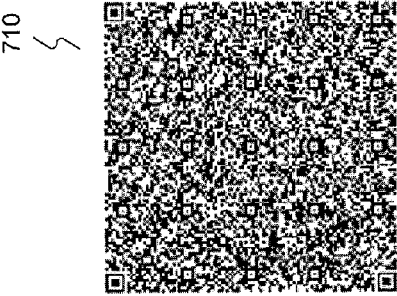

```
720
721   <schema="multi-mode; ordered">
722   <data_item type="web_address">www.kewlnewband.com</data_item>
723   <data_item type="MMS_text_message">+447786024952:video clip of the day</data_item>
724   <data_item type="SMS_text_message">+447786024951:upcoming events</data_item>
725   <data_item type="phone_call">1-800-555-0822</data_item>
726   <data_item type="audio" encoding="WAV">49 A5 23 32 F0 A2 1F CA 00 2C 87 3B
      EB 00 AD 8D 0A 33 CD 00 A8 28 52 FD 10 B9 40 A8 49 A5 23 32 F0 A2 1F CA 00
      2C 87 3B EB 00 AD 8D 0A 33 CD 00 A8 28 52 FD 10 B9 40 A80 49 A5 23 32 F0
      A2 1F CA 00 2C 87 3B EB 00 AD 8D 0A 33 CD 00 A8 28 52 FD 10 B9 40 A80 49
      A5 23 32 F0 A2 1F CA 00 2C 87 3B EB 00 AD 8D 0A 33 CD 00 A8 28 52 FD 10
      B9 40 A80 49 A5 23 32 F0 A2 1F CA 00 2C 87 3B EB 00 AD 8D 0A 33 CD 00 A8
      28 52 FD 10 B9 40 A80 49 A5 23 32 F0 A2 1F CA 00 2C 87 3B EB 00 AD 8D 0A
      33 CD 00 A8 28 52 FD 10 B9 40 A80 . . . </data_item>
727   <data_item type="text">Hey there, Kewl New Band fan!  Check us out on the web
      at www.kewlnewband.com.  And be sure to listen to our new hit single, "One-Hit
      Wonder Band"</data_item>
      </schema>
```

Fig. 7

MULTI-MODE BARCODE RESOLUTION SYSTEM

CROSS-REFERENCE TO RELATED APPLICATION

This application is a continuation of U.S. patent application Ser. No. 13/213,581, filed on Aug. 19, 2011, pending, which claims benefit of Indian Patent Application 1806/DEL/2011, filed on Jun. 24, 2011. The contents of the above-identified U.S. and Indian Patent Applications are hereby incorporated herein by reference in their entirety.

TECHNICAL FIELD

The present disclosure relates generally to methods and systems for generating and resolving barcodes.

BACKGROUND

As more and more business, governmental, academic, and scientific operations become increasingly computer-enabled and, thus, dependent on the storage and manipulation of electronic or digital information, a greater need arises for efficient mechanisms for converting "physical" information into electronic or digital information capable of storage and manipulation by computers.

"Physical" information may include essentially any kind of information that is stored primarily in tangible, physical form, such as on paper, and is not readily available in electronic or digital form, but must instead be converted or translated into electronic or digital form through the use of electronic devices and/or manual human data-entry. For example, a utility bill printed on a piece paper received by a customer may be a form of "physical" information. Although the information printed on the utility bill may already exist in electronic or digital form—for example, in a commercial database operated by the utility company—that electronic information may not be available to the customer. Instead, if the customer wishes to store or manipulate the information printed on the paper document using a computer, he or she must either manually enter the information into a computer program or use a device, such as a scanner, that is designed to convert physical information into electronic or digital information.

Although the scanner in the above the example may effectively convert physical information to electronic information by generating a digital image of the scanned paper, because the printed bill would likely have not been formatted in a manner tailored to machine scanning and information extraction, the data captured from scanning the paper may include significant unnecessary graphical data or "noise." Or, the scanner may not accurately read various characters, depending on the size of the font or the resolution of the scan. One solution that has been developed to address the need for efficiently and accurately converting physical information to electronic or digital information is the barcode.

A barcode is an optical, machine-readable image in which the information sought to be communicated by the barcode is arranged as a series of parallel lines of varying widths and spacings. Barcodes are typically scanned in a one-dimensional fashion by special-purpose optical scanning devices that are able to decode the information encoded in the barcodes by measuring the widths and spacings of the parallel barcode lines through reflective light feedback.

Traditional barcodes, however, suffer from the drawback that their one-dimensional structure allows for only a limited amount of information to be encoded in the barcode. For example, a Universal Product Code (UPC), which is a one-dimensional barcode format that enjoys widespread usage today, is capable of encoding only 12 decimal digits or a total of 95 binary bits, including start and end patterns. Because of this limitation, the last couple decades have seen significant growth in the number of standards for two-dimensional or "matrix" barcodes.

Many matrix barcodes provide similar functionality of traditional one-dimensional barcodes by providing a pattern of two-dimensionally arranged squares or other shapes of varying lengths and widths. One example of a type of matrix barcode that has enjoyed popular usage is the Quick Response or "QR" Code standard, an example of which is depicted in FIG. 1. Governed by several standards, QR Codes are capable of storing up to 7,089 decimal numeric code characters, 4,296 ASCII alphanumeric characters, or 2,953 bytes when encoding purely binary data.

Although by no means a new standard, QR Codes have recently gained widespread use as a result of the advancement of mobile devices, such as smartphones, capable of reading and quickly interpreting barcode data such as QR Codes. One common use of QR Codes, as depicted in FIG. 1, has been to encode Uniform Resource Locators ("URLs"), such as website addresses, within QR Codes placed on billboards, mailers, or even buildings to provide consumers with a quick and easy way to visit a company's website without having to memorize, write down, or manually type a URL into a smartphone or other mobile device. Consumers who see a QR Code displayed may take a picture of the QR Code using a camera embedded in the smartphone, for example, and may utilize a smartphone application to automatically translate the QR Code to a URL and launch a browser application pointed to the URL. Additional commercial uses of QR Codes include encoding coupons or other purchase information into QR Codes that customers may decode into graphical or textual coupons to present at businesses to receive discounts on purchased goods or services.

However, as the use of QR codes and other matrix barcodes becomes more widespread, a problem has emerged as the type and sophistication of commercially available scanning devices varies greatly. It therefore becomes a challenge to determine what kind of information to encode in barcodes that will be readable and actionable for the largest number of user scanning devices. Whereas an increasing number of mobile devices may be capable of scanning and decoding barcodes, those mobile devices may vary greatly in terms of which actions they may be capable of taking in response to decoded barcodes.

For example, an author of a barcode may choose to encode a URL in a barcode, such as a URL that points to a webpage containing information about the author's products. However, not all scanning devices capable of decoding the barcode may have web browsing capabilities. Some mobile devices may be capable only of initiating standard telephone calls or sending SMS text messages. Or, a scanning device may have web browsing capabilities, but the smart phone user may not have a data plan that provides for web browsing. Some mobile devices may be SMS capable, but not MMS capable. Moreover, some mobile devices may have sophisticated scanning capabilities, such as the ability to decode barcodes that contain audio or video content and the ability to play such audio or video content, but have no ability to communicate with other devices, such as through wireless transmission or otherwise.

The author of a barcode who wishes to widely disseminate information is thus presented with a predicament. On the one hand, the author may choose to encode a form or type of data into a barcode that will provide users who scan the barcode with the best quality of information or data richness, such as a hyperlink to a webpage or a video clip, in order to accomplish the most effective marketing of the author's information. However, such an approach may greatly limit the extent to which the information can be disseminated to the general public, as many users may use scanning devices that are not capable of accessing or rendering such content. Therefore, on the other hand, the author may choose to encode information in a barcode using a lowest common denominator approach—i.e., by encoding data in the simplest form, such as plain text, that will pose the least technological challenge for the greatest number of scanning devices. However, this latter approach may greatly limit the effectiveness of a barcode marketing campaign, since many users may be denied richer forms of information that their scanning devices would be able to access or render.

Thus, there is a need for methods and systems for incorporating multiple, distinct data items of different types into a single barcode, such as a QR Code, that will allow different users to access different forms of information according to the capabilities of their scanning devices.

SUMMARY OF THE INVENTION

The invention comprises methods and systems for incorporating multiple, distinct data items of different types into a single barcode, such as a QR Code, that will allow different users to access different forms of information according to the capabilities of their scanning devices. A barcode may, for example, encode both a URL pointing to a webpage descriptive of the barcode author's business and a plain text string that provides basic information about the author's business and directions to the physical location of the business. A first user who scans the barcode may use a first scanning device capable of web browsing and thus may access the webpage referenced by the URL upon scanning the barcode, and potentially ignoring the plain text string. A second user who scans the barcode may use a second scanning device that is not capable of web browsing and thus may simply view the encoded text string using a display interface of the second scanning device. Therefore, a single barcode may provide helpful information to both the first user and the second user according the capabilities of the first and second scanning devices, without resorting to the lowest common denominator of capabilities across all possible devices.

In one embodiment, a multi-mode barcode consistent with the disclosed invention may also specify a preference order for the multiple encoded data items of different types. Or, a scanning device itself may have a factory- or user-supplied preference order for acting on different types of data encoded in the multi-mode barcode. The invention may be applied to any type of barcode standard, including 2-dimensional matrix barcodes, such as QR codes.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and, together with the description, serve to explain the principles of the invention. In the drawings:

FIG. 7 is a diagram depicting an exemplary multi-mode barcode, consistent with certain disclosed embodiments.

DETAILED DESCRIPTION OF THE INVENTION

Figure 1:
FIG. 1 depicts an exemplary, conventional QR code, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 depicts an exemplary, conventional QR code, consistent with certain disclosed embodiments. In the QR Code 100, information representing a URL 110 is encoded as a series of black and white boxes arranged in two dimensions.

Figure 2:
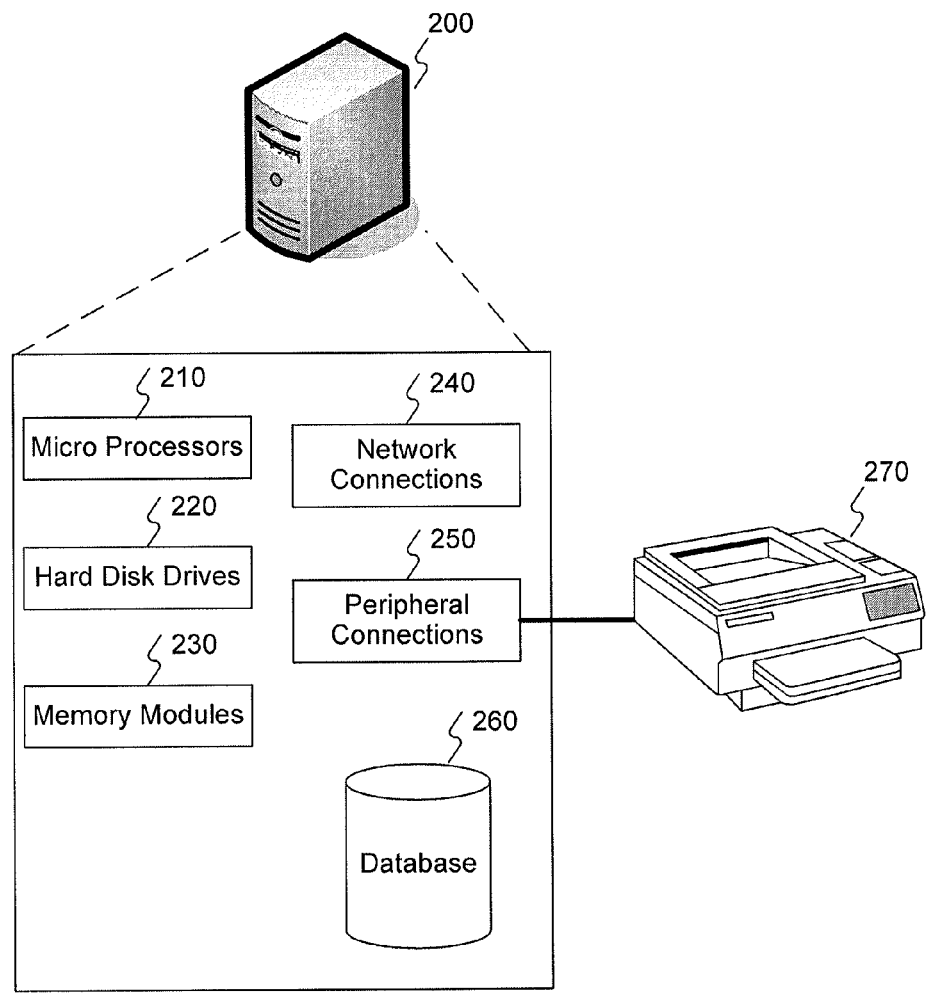
FIG. 2 is a diagram depicting an exemplary device for generating multi-mode barcodes, consistent with certain disclosed embodiments.

FIG. 2 is a diagram depicting an exemplary device for generating multi-mode barcodes, consistent with certain disclosed embodiments. Device 200 may be essentially any kind of computing device capable of inputting information; manipulating that information, such as formatting it into a text-delimited or XML-delimited textual scheme; and translating the formatted text into a graphical barcode, such as a QR Code. For example, device 200 may be a general purpose computer, comprising one or more micro processors 210 of varying core configurations and clock frequencies; one or more hard disk drives 220 of varying physical dimensions and storage capacities; one or more random access memory (RAM) modules 230 of varying clock frequencies and memory bandwidth; one or more input/output network connections 240; and one or more peripheral connections or interfaces 250. Device 200 may include or be operatively connected—e.g., by network or wireless connection—to printing device 270 capable of printing any generated barcodes on a number of physical materials, such as paper, plastic, billboard material, etc. Those skilled in the art will appreciate that device 200 or the owner or operator associated with device 200 need not necessarily print or graphically render any barcodes that it generates, but instead may provide electronic or digital data representative of generated barcodes to third parties for printing or distributing the barcodes in other manners.

Figure 3:
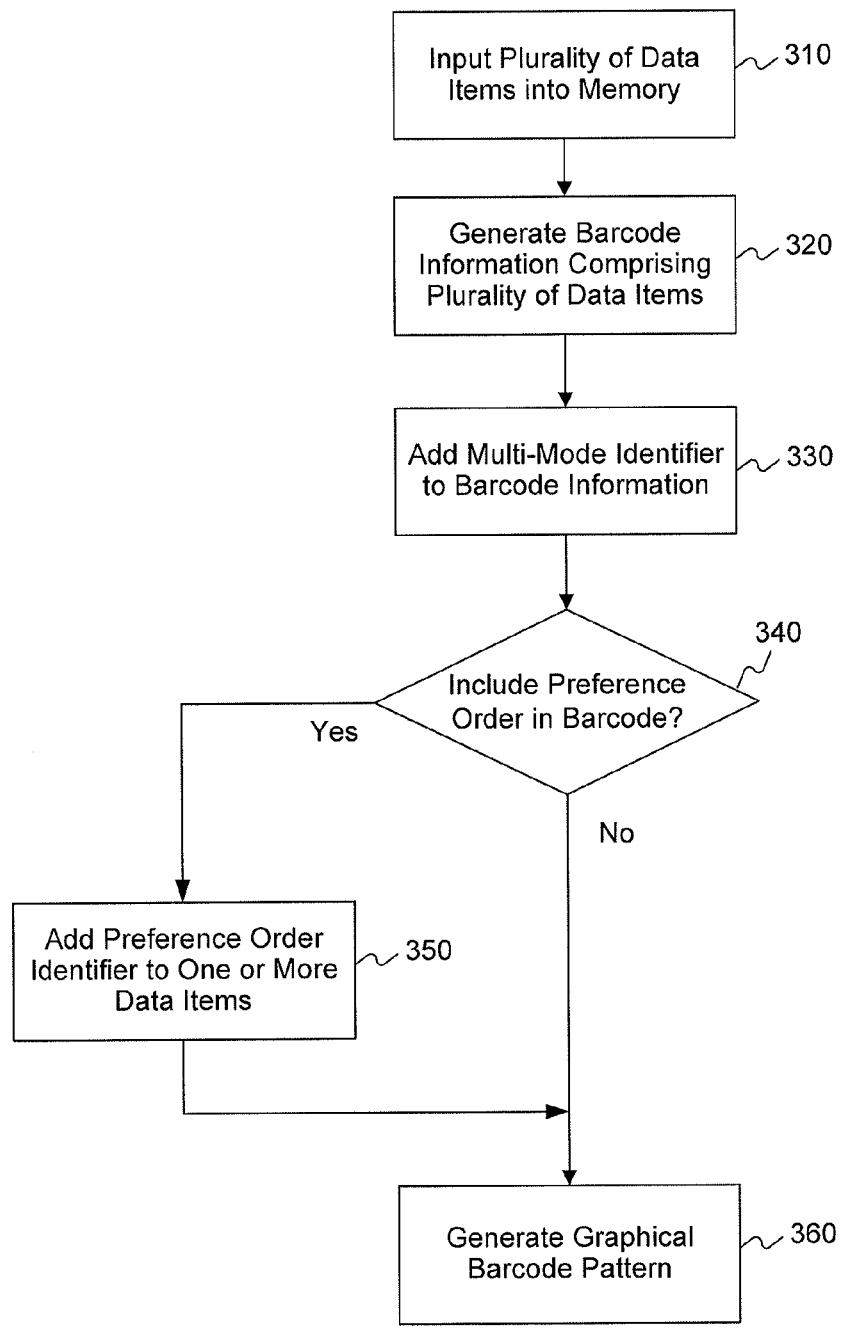
FIG. 3 is a flow diagram illustrating an exemplary method of generating a multi-mode barcode, consistent with certain disclosed embodiments.

FIG. 3 is a flow diagram illustrating an exemplary method of generating a multi-mode barcode, consistent with certain disclosed embodiments. In step 310, a plurality of data items are input and/or retrieved from memory by device 200. A data item may comprise any distinct collection of data that may be encoded in a barcode, such as, a text string, an email address, a phone number, a web address, an image, an audio or video segment, etc. In some embodiments, one or more data items may specify an action to be taken, such as sending an email to a particular email address containing a particular message, downloading a webpage indicated by a URL, calling or sending a text message to a particular phone number, displaying an image, playing an audio or video clip, posting a message to a social networking website, adding a particular event to a calendar, initiating a financial transaction, etc.

Figure 4:
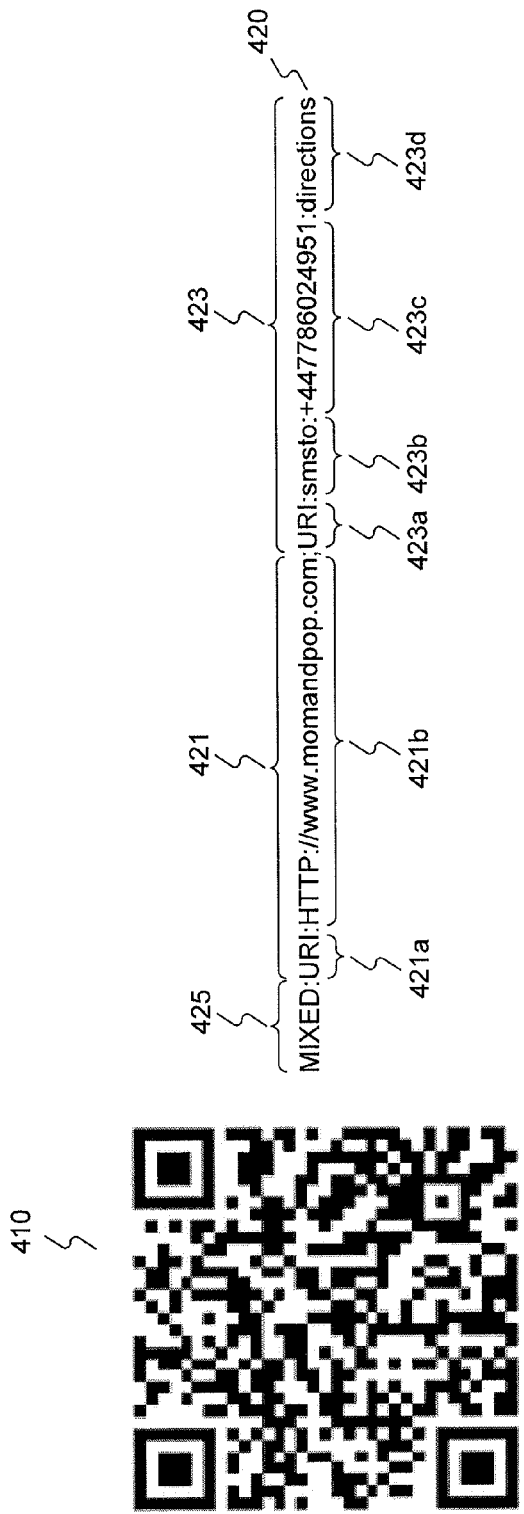
FIG. 4 is a diagram depicting an exemplary multi-mode barcode, consistent with certain disclosed embodiments.

In step 320, device 200 arranges the plurality of data items into a formatted binary or textual string of barcode information for subsequent encoding in a barcode. For example, as depicted in FIG. 4, a text string 420 may include data items 421 and 423. Data item 421 may represent a uniform resource identifier ("URI") 421b, as flagged by textual identifier 421a. Data item 423 may represent a URI in the form of an instruction 423b to send a text message to telephone number 423c that includes text 423d.

In step 330, device 200 adds a multi-mode identifier to the barcode information to indicate that the barcode information includes multiple data items of different types. For example, barcode information 420 may include a textual multi-mode identifier 425 located at the beginning of the barcode information that indicates that the barcode information include multiple data items of different types. Multi-mode identifier 425 may indicate the "schema" or format of the following textual information, and thus indicate to devices that read the barcode associated with barcode information 420 that multiple data items of different types may be found in the barcode, as delimited in a particular manner, such as by a semicolon.

In some embodiments, device 200 may further add information to the barcode information to specify a particular order in which a scanning device reading a barcode that contains barcode information 420 may take actions with respect to the different data items contained therein. For example, although not depicted in FIG. 4, barcode information 420 could include information to indicate that a scanning device should launch a browser to view the webpage associated with URI 421b if it has web browsing capabilities, and, if the scanning device does not have web browsing capabilities, to send a text message in accordance with data item 423 as a second option.

Therefore, in step 340, device 200 may determine whether it has been instructed to include a preference order in the barcode that it is generating. If device 200 is instructed to add a preference order to the barcode (step 340, Yes), then device 200 may add a preference order identifier to one or more data items in the barcode information (step 350). Alternatively, rather than adding preference order to data to each and every data item in the barcode information, device 200 may instead simply add a single section of textual data, such as at the beginning of the barcode information, to indicate an ordering of the data items that follow.

If device 200 is not instructed to add a preference order to the barcode (step 340, No), or after device 200 has added preference order information to the barcode, device 200 may then generate a graphical barcode pattern, such as barcode 410, that encodes the barcode information, such as barcode information 420. Although depicted as a QR Code in FIG. 4, barcode 410 may be any type of barcode such as a two-dimensional universal product code ("UPC") barcode; a stacked barcode, such as a "Codablock" or PDF417 barcode, a high capacity color barcode, DataGlyphs, etc.

Figure 5:
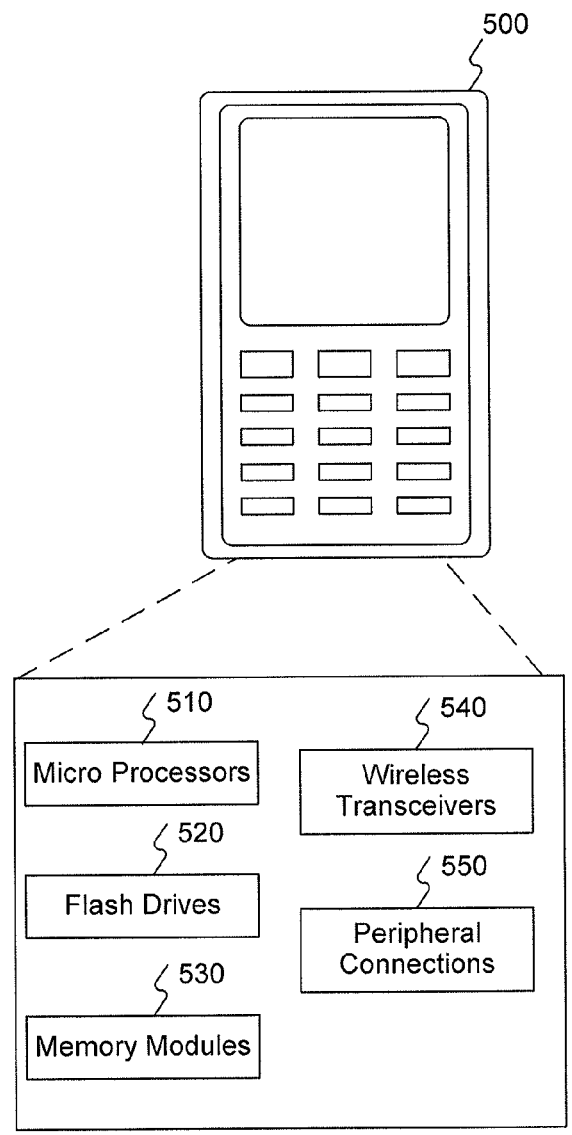
FIG. 5 is a diagram depicting an exemplary device for reading multi-mode barcodes, consistent with certain disclosed embodiments.

FIG. 5 is a diagram depicting an exemplary device for reading and taking action in response to a multi-mode barcode, consistent with certain disclosed embodiments. Device 500 may be essentially any kind of computing device capable of optically reading graphical bar code data; decoding the graphical bar code data to derive bar code information; and operating on that information by performing various operations such as one or more of displaying text or images, initiating a telephone call, sending a text message, accessing a webpage, playing audio or video content, etc. For example, device 500 may be a commercially available mobile device such as a mobile phone or smartphone with optical camera componentry and one or more software applications for decoding images of barcodes captured by the camera componentry.

Device 500 may further comprise one or more micro processors 510 of varying core configurations and clock frequencies; one or more flash drives 520 of varying physical dimensions and storage capacities; one or more random access memory (RAM) modules 530 of varying clock frequencies and memory bandwidth; one or more wireless transceivers 540; and one or more peripheral connections or interfaces 550. Device 500 may communicate with other devices via cellular wireless access, such as using Code Division Multiple Access ("CDMA"), via wireless Ethernet protocols, or via a serial wire interface such as USB, etc.

Figure 6:
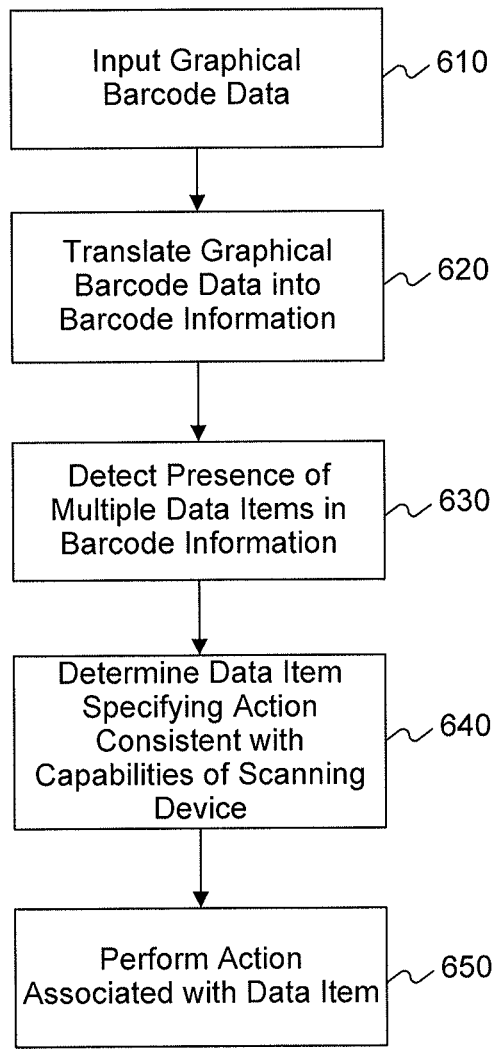
FIG. 6 is a flow diagram illustrating an exemplary method of reading a multi-mode barcode, consistent with certain disclosed embodiments.

FIG. 6 is a flow diagram illustrating an exemplary method of reading and authenticating a multi-mode barcode, consistent with certain disclosed embodiments. In step 610, scanning device 500 optically reads a barcode such as multi-mode bar code 710. Those skilled in the art will appreciate that device 500 may include functionality or logic for reading multiple types of barcodes and, for each type of barcode, determining whether the barcode is a multi-mode barcode, consistent with disclosed embodiments of this invention, or a conventional type of barcode.

In step 620, scanning device 500 decodes barcode 710 to translate the graphical patterns of the physical barcode into the information encoded within the barcode—e.g., barcode information 720—according to the standards of the relevant barcode type, for example using a dedicated barcode decoding software or hardware component. In step 630, scanning device 500, through analyzing barcode information 720 or otherwise, detects that barcode 710 is a multi-mode barcode, consistent with disclosed embodiments of the invention. For example, scanning device 500 may detect the presence of multiple distinct data items 722-727 of different types in barcode information 720. Alternatively, scanning device 500 may detect the presence of an identifier, such as identifier 721, that indicates that barcode 710 is a multi-mode barcode.

Scanning device 500 may respond to the present of multiple data items in a number of different ways. In one embodiment, scanning device 500 may choose to perform an action specified by a data item according to the capabilities of the scanning device (steps 640 and 650). For example, as depicted FIG. 7, barcode information 720 is encoded as XML encoded text containing separate XML elements representing separate data items 722-727. Data item 722 may represent a data item of type "web_address" in the form of a domain name. If device 500 is able to connect to the Internet to access the webpage specified by the domain name (and, e.g., if the device is associated with an appropriate data plan for such Internet access), device 500 may elect to retrieve the specified webpage using standard hypertext transfer protocol ("HTTP") operations and display the webpage to the user on a screen or other output means.

If scanning device 500 is not capable of accessing webpages, or if scanning device 500 is not associated with an appropriate data plan for such Internet access, scanning device 500 may instead execute the action specified by data item 723. That is, scanning device 500 may send a text message to the specified phone number that includes the text "video clip of the day." In response, scanning device 500 may receive a multimedia messaging service ("MMS") text message containing a video clip. Because data item 723 is of the type "MMS_text_message," scanning device 500 may elect to take the action specified by data item 723 only if it is capable of receiving MMS text messages.

If scanning device 500 is not capable of receiving MMS text messages, or if scanning device 500 is not associated with an appropriate data plan for MMS text messages, scanning device 500 may instead execute the action specified by data item 724. That is, scanning device 500 may send a text message to the specified phone number that includes the text "upcoming events." In response, scanning device 500 may receive a short message service ("SMS") text message containing plain text about upcoming events or other news.

If scanning device 500 is not capable of receiving SMS text messages, or if scanning device 500 is not associated with an appropriate data plan for SMS text messages, scanning device 500 may instead execute the action specified by data item 725. That is, scanning device 500 may initiate a standard voice telephone call to the telephone number specified by data item 725. For example, the specified telephone number may provide pre-recorded news or product information, or may connect the user to a person capable of providing information or answering questions about the subject matter or author of the barcode.

If scanning device 500 is not capable of initiating telephone calls, or if scanning device 500 is not associated with an appropriate service plan for telephone calls, scanning device 500 may instead execute the action specified by data item 726. That is, scanning device 500 may play an audio clip, the contents of which are specified by the hexadecimal data provided by data item 726.

If scanning device 500 is not capable of decoding audio data or playing audio clips, scanning device 500 may instead execute the action specified by data item 727. That is, scanning device 500 may simply display the textual data provided by data item 727.

Although not depicted in FIG. 7, additional types of data items that may be encoded in a multi-mode barcode, consistent with this invention, include an email address to which to send an email; an email message that may be sent to an email address of the scanning device's or the user's choosing; contact details, such as a vCard; an event that may be added to an electronic calendar; an address or other location information that may be input into an electronic or mobile mapping program; a link or other mechanism for enabling a user to make a purchase, donate to a cause, or otherwise effect monetary transactions; a link or other mechanism to post or share an item using a social networking website or platform; a video clip; etc.

As described above, scanning device 500 could elect to execute an action associated with a scanning device based on a capability of the scanning device. If scanning device 500 is capable of executing more than one type of data item included in the multi-mode barcode, scanning device may elect to execute the action associated with the richest type of data experience for the user. For example, scanning device 500 could be configured to always elect to access webpages, if specified by a multi-mode barcode, over other data communication actions, such as text messages or phone calls. Scanning device 500 could also be configured to always elect to access resources that require data connectivity to other devices, such as receiving text messages or placing phone calls, over actions that involve purely local actions, such as playing audio or video clips or displaying text. Scanning device 500 could also be configured to always elect to display or play media or multimedia, such as audio or video clips or pictures, over data items that specify only plain text to display.

Scanning device 500 may maintain an internal preference order indicating which types of data items should receive preference over which other types of data items in the event that multiple data items of different types are encoded in a multi-mode barcode, consistent with this invention. Scanning device 500 may also allow a user to specify a preference order for data item types. For example, a user may instruct scanning device 500 to access webpages as a first preference, if a web address is specified by the barcode, and to display plain text as a second preference. The user may configure scanning device 500 to take actions specified by data items according to a simplest to most complex fashion, according to an order that will result in the lowest amount of data transfer that will charged against the user's account, or according to media preference order (e.g., videos, whether through web access or as provided by the barcode, are to be preferred, over audio, which itself is to be preferred over images and over text). Scanning device 500 may also provide functionality for prompting the user to select which action to take when multiple types of data items are included in a multi-mode barcode.

As depicted in FIG. 7, a multi-mode barcode itself may specify a preference order for its multiple data items. For example, multi-mode identifier 721 not only indicates that barcode is of type "multi-mode," but also indicates that the actions specified by the following data items 722-727 have a preference ranking according to the order in which they occur in the barcode information 720. Alternatively, although not depicted in FIG. 7, barcode information 720 could provide a separate preference identifier for each data item 722-727.

Scanning device 500 may detect the preference identifier 721 specified by barcode information 720 and execute the action specified by the first data item in the sequence of data items for which scanning device is capable of taking the specified action. Scanning device 500 could also choose to ignore any preference information provided by barcode information 720 and elect instead to follow a preference order specified by scanning device 500, such as a default device-specific preference order, a user-supplied preference order, or a real-time user indication of which action to take in response to a user prompt.

In another embodiment, a barcode may include a data item that instructs the user's scanning device to communicate with a separate external device, such as a server. The scanning device, after decoding the barcode, may communicate with the server and may indicate information specified by the barcode, such as a unique number or other identifier and/or information regarding the capabilities of the scanning device. In response, the server may transmit information back to the scanning device. For example, the server may present the scanning device, and thus the user, with a series of options for accessing various types of information, such as webpages, text message information, audio or video content, plain text, etc. The user may then select which type of data the user would like to access, or the scanning device may make a selection automatically for the user. Alternatively, the server may determine one or more appropriate types of data to provide to the scanning device in accordance with the capabilities of the scanning device, and may send only those appropriate types of data back to the scanning device, or may present only those options to the scanning device.

Using this technique, a multi-mode barcode in accordance with the invention may indirectly specify multiple data types by providing an index or other kind of identifier in the barcode, and that index may be resolved by a separate server to specify the multiple actions specified by the barcode. Also, using this technique, the author of the barcode, or the operator of the resolution server, may dynamically change the data items associated with a given barcode at a later time without having to modify the barcode itself.

Those skilled in the art will appreciate that, although described primarily in the context of barcodes for optical scanning, the present invention may be applied to any situation in which physical objects or phenomena in which machine-readable information has been encoded are converted to digital or electronic data by a scanning, listening, or other detection advice. For example, the present invention may be applied to information encoded within magnetic strips, audio signals, RFID signals, near field communication (NFC) signals, and other real-world "hardlinks."

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

The invention claimed is:

1. A computer-implemented method for selectively translating and presenting data content specified in scanned multi-mode barcodes, the method comprising:
   inputting, by an optical scanning component of a scanning device, graphical data representing a barcode pattern, wherein the scanning device includes one or more processors coupled to the optical scanning component;
   translating, by the scanning device, the graphical data into barcode information;
   detecting, by the scanning device, that a plurality of distinct data items is present in the barcode information, wherein each data item of the plurality of distinct data items specifies human-understandable content and an action to be taken by the scanning device to provide the human-understandable content;
   transmitting, to a remote server, a request for a preference order for execution of a plurality of actions specified by the plurality of distinct data items, wherein the remote server includes at least one processor programmed to receive and answer, via at least one network connection, requests for preference orders for execution of actions specified by distinct data items in multi-mode barcodes;
   receiving, in response to the request, the preference order indicating a ranking of the plurality of distinct data items;
   determining an order in which the plurality of actions specified by the plurality of distinct data items are to be taken by the scanning device based on the ranking;
   selecting a preferred data item in the plurality of distinct data items for which the scanning device is capable of taking the action specified by the preferred data item, wherein the action specified by the preferred data item has a higher ranking in the preference order than other actions specified by all other data items in the plurality of distinct data items that the scanning device is capable of taking; and
   providing, by the scanning device, the human-understandable content via the action specified by the preferred data item.

2. The method of claim 1, wherein the barcode information further comprises one or more preference order identifiers indicating a default order in which the scanning device should perform the plurality of actions associated with the plurality of data items.

3. The method of claim 1, further comprising:
   detecting that the plurality of distinct data items are associated with a plurality of data types; and
   providing, to the remote server, the plurality of data types in the request for the preference order.

4. The method of claim 3, wherein the plurality of distinct data items includes at least a first data item associated with a first data type of the plurality of data types and a second data item associated with a second data type of the plurality of data types.

5. The method of claim 3, wherein the plurality of data types include a web address, plain text, an email address, a text message, an image, a sound, an SMS text message, or an MMS text message.

6. The method of claim 3, wherein the barcode information further comprises one or more preference order identifiers indicating a default order in which the scanning device should perform the plurality of actions specified by the plurality of data types.

7. The method of claim 3, wherein receiving the preference order further comprises:
   receiving, in response to the request, the preference order indicating a ranking of the plurality of data types; and
   determining the order in which the plurality of actions specified by the plurality of data types are to be taken by the scanning device based on the ranking of the plurality of data types.

8. The method of claim 7, wherein selecting the preferred data item in the plurality of distinct data items further comprises:
   determining one or more suitable data items for which the scanning device is capable of taking the plurality of actions specified by the one or more distinct data items; and
   identifying the preferred data item in the one or more suitable data items, wherein the data type associated with the preferred data item has a higher ranking than the data types associated with all other data items in the one or more suitable data items.

9. The method of claim 8, further comprising:
prompting a user to select a preferred action to take from among the plurality of actions specified by the one or more suitable data items;
receiving an indication of a user selection of the preferred action; and
performing the preferred action selected by the user.

10. The method of claim 1, wherein the request includes one or more capabilities of the scanning device, and wherein the remote server generates the preference order based on the one or more capabilities of the scanning device.

11. The method of claim 10, wherein the one or more capabilities of the scanning device includes at least one of a wireless connectivity, a web browsing capability, a plain-text processing capability, an email processing capability, a text message processing capability, an image processing capability, or a sound processing capability.

12. The method of claim 11, wherein the text message processing capability includes at least one of an SMS processing capability or an MMS processing capability.

13. The method of claim 1, further comprising:
prompting a user to select a preferred action to take from among the plurality of actions specified by the plurality of data items;
receiving an indication of a user selection of the preferred action; and
performing the preferred action selected by the user.

14. A system for selectively translating and presenting data content specified in scanned multi-mode barcodes, comprising:
a scanning device comprising an optical scanning component that inputs graphical data representing a barcode pattern, a processing system comprising one or more processors coupled to the optical scanning component and a memory system comprising one or more computer-readable media, wherein the computer-readable media store instructions that, when executed by the processing system, cause the scanning device to perform operations comprising:
translating the graphical data into barcode information;
detecting that a plurality of distinct data items is present in the barcode information, wherein each data item of the plurality of distinct data items specifies human-understandable content and an action to be taken by the scanning device to provide the human-understandable content;
transmitting, to a remote server, a request for a preference order for execution of a plurality of actions specified by the plurality of distinct data items, wherein the remote server comprises at least one processor programmed to receive and answer, via at least one network connection, requests for preference orders for execution of actions specified by distinct data items in multi-mode barcodes;
receiving, in response to the request, the preference order indicating a ranking of the plurality of distinct data items;
determining an order in which the plurality of actions specified by the plurality of distinct data items are to be taken by the scanning device based on the ranking;
selecting a preferred data item in the plurality of distinct data items for which the scanning device is capable of taking the action specified by the preferred data item, wherein the action specified by the preferred data item has a higher ranking in the preference order than other actions specified by all other data items in the plurality of distinct data items that the scanning device is capable of taking; and
providing the human-understandable content via the action specified by the preferred data item.

15. The device of claim 14, wherein the barcode information further comprises one or more preference order identifiers indicating a default order in which the scanning device should perform the plurality of actions associated with the plurality of data items.

16. The device of claim 14, wherein the operations specified by the computer-readable media further comprise:
detecting that the plurality of distinct data items are associated with a plurality of data types; and
providing, to the remote server, the plurality of data types in the request for the preference order.

17. The device of claim 16, wherein the operations specified by the computer-readable media further comprise:
receiving, in response to the request, the preference order indicating a ranking of the plurality of data types; and
determining the order in which the plurality of actions specified by the plurality of data types are to be taken by the scanning device based on the ranking of the plurality of data types.

18. The device of claim 17, wherein the operations specified by the computer-readable media further comprise:
determining one or more suitable data items for which the scanning device is capable of taking the plurality of actions specified by the one or more distinct data items; and
identifying the preferred data item in the one or more suitable data items, wherein the data type associated with the preferred data item has a higher ranking than the data types associated with all other data items in the one or more suitable data items.

19. The device of claim 14, wherein the request includes one or more capabilities of the scanning device, and wherein the remote server generates the preference order based on the one or more capabilities of the scanning device.

20. The device of claim 19, wherein the one or more capabilities of the scanning device includes at least one of a wireless connectivity, a web browsing capability, a plain-text processing capability, an email processing capability, a text message processing capability, an image processing capability, or a sound processing capability.

* * * * *